United States Patent
Hiatt et al.

(10) Patent No.: US 6,426,004 B1
(45) Date of Patent: Jul. 30, 2002

(54) CONTINUOUS FLOW COMPLETELY MIXED WASTE WATER TREATMENT METHOD

(75) Inventors: William C. Hiatt, Hendersonville, NC (US); Walter V. Burnham, Lake Jackson, TX (US); Edward G. Madzy, Sparta, NJ (US); Walter Weisbrodt, Deidesheim; Uwe Wegmann, Mannheim, both of (DE)

(73) Assignee: BASF Corporation, Mt. Olive, NJ (US)

(*) Notice: Subject to any disclaimer, the term of this patent is extended or adjusted under 35 U.S.C. 154(b) by 0 days.

(21) Appl. No.: 09/661,872

(22) Filed: Sep. 14, 2000

(51) Int. Cl.[7] .................................................. C02F 3/00
(52) U.S. Cl. ..................... 210/605; 210/610; 210/620; 210/739
(58) Field of Search ............................ 210/605, 610, 210/620, 629, 630, 739

(56) References Cited

U.S. PATENT DOCUMENTS

| | | | | |
|---|---|---|---|---|
| 4,280,910 A | * | 7/1981 | Baumann | 210/103 |
| 4,749,494 A | * | 6/1988 | Tomoyasu et al. | 210/626 |
| 4,818,408 A | * | 4/1989 | Hamamoto | 210/614 |
| 4,911,838 A | * | 3/1990 | Tanaka | 210/221.2 |
| 4,917,805 A | * | 4/1990 | Reid | |
| 4,940,544 A | * | 7/1990 | Gode et al. | 210/603 |
| 5,304,308 A | * | 4/1994 | Tsumura et al. | 210/614 |
| 5,611,927 A | | 3/1997 | Schmid | |
| 5,626,754 A | * | 5/1997 | Ballnus | |
| 5,626,755 A | | 5/1997 | Keyser et al. | 210/614 |
| 5,785,854 A | * | 7/1998 | McKinney | 210/197 |
| 6,193,220 B1 | * | 2/2001 | Kelly | 210/629 |

FOREIGN PATENT DOCUMENTS

| | | | | |
|---|---|---|---|---|
| DE | 3501585 A1 | 8/1985 | ............. | C02F/3/12 |
| DE | 244970 A1 | 4/1987 | ............ | C02F/11/12 |
| DE | 3915026 A1 | 11/1989 | ............. | C02F/3/30 |
| FR | 2741872 A1 | 6/1997 | ............. | C02F/3/10 |
| WO | WO 9000158 | 1/1990 | ............. | C02F/3/02 |
| WO | WO 9629290 | 9/1996 | ............. | C02F/3/30 |

OTHER PUBLICATIONS

English language translations of the abstracts for: DE 3501585A1; DE3915026A1; DD244970A1; and FR2741872A1.

* cited by examiner

Primary Examiner—Chester T. Barry
(74) Attorney, Agent, or Firm—Fernando A. Borrego

(57) ABSTRACT

A method and a reactor system for continuous waste water treatment are disclosed. The method involves the steps of continuously flowing an influent into a treatment basin and continuously flowing an effluent out of the treatment basin into a clarifier. The influent is continuously and completely mixed in the treatment basin. In an additional step, oxygen is introduced into the basin for a first predetermined time period. The introduction of oxygen into the basin is then stopped for a second predetermined time period and then the steps of introducing and stopping the oxygen are repeated. The reactor system includes a treatment basin having an inlet for continuously receiving an influent stream, an outlet for continuously discharging an effluent stream, and contains a mixed liquor. At least one mixer completely and homogeneously mixes the mixed liquor. At least one source of oxygen discharges into the mixed liquor and a controller connected to the source of oxygen cycles the source of oxygen on and off In another embodiment the present invention is a reactor system for treating waste water comprising: a treatment basin having an inlet for continuously receiving an influent stream, an outlet for continuously discharging an effluent stream, and containing a mixed liquor; at least one mixer, said at least one mixer completely and homogeneously mixing said mixed liquor; at least one source of oxygen, said at least one source of oxygen discharging oxygen into said mixed liquor; and a controller connected to said at least one source of oxygen, said controller cycling said at least one source of oxygen on and off to provide alternating cycles of aerobic and anoxic conditions in the basin.

6 Claims, 1 Drawing Sheet

CONTINUOUS FLOW COMPLETELY MIXED WASTE WATER TREATMENT METHOD

BACKGROUND OF THE INVENTION

The invention relates to a novel operating scheme for enabling multiple processing environments in a single continuous flow completely mixed waste water treatment reactor system.

Controlling biological wastewater treatment processing in the chemical industry requires balancing many competing elements. The waste water of the chemical industry frequently contains high levels of organic carbon, ammonia and nitrates. Thus the treatment procedure may require the simultaneous removal of organic carbon, ammonia, nitrates and other priority pollutants.

Nitrification, the biological oxidation of ammonia to nitrates by autotrophic bacteria, is typically utilized to remove ammonia from waste water. This process thus generates additional nitrates as the ammonia is oxidized. These autotrophic bacteria generally use carbon dioxide as a carbon source during the nitrification reaction. The nitrification is a sensitive process and requires, for example, prescribed temperatures, a specific pH range, and an aerobic environment with a dissolved oxygen content of generally more than 2 mg $O_2$/L. In addition, excessive amounts of inhibitory compounds such as salts, certain amines, and other compounds must be avoided. Another requirement is a long Solids Retention Time (SRT), which means a balance of moderate organic carbon levels in proportion to ammonia, to allow the slowly growing autotrophic bacteria to complete with the faster growing heterotrophic bacteria found in the waste water.

Denitrification, the biological reduction of nitrates to nitrogen gas with the utilization of the organic carbon waste by heterotrophic bacteria, is typically used to remove nitrates and organic carbons from the waste water. The primary requirements for denitrification include an anoxic environment with a dissolved oxygen content of less than 0.5 mg $O_2$/L and adequate organic carbon substrate to balance the nitrate levels. Without adequate organic carbon, the heterotrophic bacteria can not reduce the nitrates. Thus, the dissolved oxygen requirements for nitrification and denitrification are mutually exclusive.

Several processes have been developed in an attempt to handle waste water having high levels of organic carbon, ammonia and nitrates using the nitrification and denitrification reactions. One process is a two sludge system that employs anoxic conditions with heterotrophic bacteria to consume organic carbon and reduce nitrates in a first bioreactor with solids recycling and a second independent bioreactor system under aerobic conditions to oxidize the ammonia. This process has the advantage of completely separating the nitrification and denitrification steps and is used where nitrates are present in the influent. The disadvantages of this process include a high capital cost and the inability to denitrify the nitrates generated in the nitrification step. This inability can be a significant problem when the level of ammonia in the influent is high.

Another process employs a single sludge system with two or more bioreactors. In this process, anoxic conditions are maintained in one vessel to facilitate denitrification while aerobic conditions are maintained in another vessel (or vessels) to facilitate nitrification. This arrangement is suitable to consume nitrates present in the influent waste water, but also suffers from an inability to denitrify the generated nitrates from the oxidation of ammonia. One way used to manage nitrification and denitrification in a single sludge process involves an internal recirculation step. This internal recirculation step is employed in the "Carousel" process, oxidation ditches and the Modified Ludzak-Ettinger (MLE) process. These processes function by creating different process conditions spatially within a single plug flow reactor, and recirculating generated nitrates from the aerobic zone to the anoxic zone. These modified methods are suitable for plug flow reactors treating waste water in which toxic overloads of chemicals are not an issue, but the methods cannot be adapted to a single vessel system. In many cases, these multiple vessel systems require very large piping and pumping systems, which are expensive to build and operate and may require system shutdown and major modifications. Because of the possibility of organic overload or toxic-inhibitory situations, most chemical industry wastewater treatment plants utilize completely mixed aeration basin systems.

Another process that is used is commonly known as a sequencing batch reactor (SBR). In a SBR a single vessel is employed for bioprocessing and solids separation. The system is not a continuous flow system, instead, waste water must be treated in batches. The SBR process is particularly useful for small municipal systems. This complete mixed single vessel can be adapted to nitrification and denitrification by creating anoxic and aerobic zones in the same vessel that are temporally separated, i.e., at different times during the batch cycle. One disadvantage of this process is the batch nature and an inability to adapt it to existing continuous flow systems. A further disadvantage is that it requires a separate system to store the waste water, which is continually produced, until it can be loaded into the batch reactor.

Thus, prior art processes can all be classified into two distinct groups. Continuous flow processes that maintain different physical zones for nitrification and denitrification. These processes are classified as spatially distinct. Batch processes that are not continuous flowing and that operate the entire system under uniform conditions, which vary between anoxic to aerobic at different times during the batch. These processes are classified as temporally distinct.

SUMMARY OF THE INVENTION

In general terms, this invention provides a single continuous flow completely mixed waste water treatment reactor system that is capable of multiple processing environments while maintaining continuous flow.

In one embodiment the present invention comprises a method for treating waste water comprising the steps of continuously flowing an influent into a treatment basin and continuously flowing an effluent out of the treatment basin into a clarifier. The method further comprises continuously completely mixing the influent in the treatment basin. In an additional step, oxygen is introduced into the basin for a first predetermined time period. The method further includes stopping the introduction of oxygen into the basin for a second predetermined time period and then repeating the steps of introducing and stopping the oxygen. In another embodiment the method further comprises introducing a supplemental source of carbon into the basin for a third predetermined time period, with the third predetermined time period being no greater than the second predetermined time period.

In another embodiment the present invention is a reactor system for treating waste water comprising: a treatment basin having an inlet for continuously receiving an influent stream, an outlet for continuously discharging an effluent stream, and containing a mixed liquor; at least one mixer, said at least one mixer completely and homogeneously mixing said mixed liquor; at least one source of oxygen, said at least one source of oxygen discharging oxygen into said mixed liquor; and a controller connected to said at least one source of oxygen, said controller cycling said at least one source of oxygen on and off.

The present invention offers several advantages over the prior art. The present invention demonstrates how an existing completely mixed reactor system can be modified to provide a continuously flowing reactor that is able to carry out both nitrification and denitrification. The system significantly reduces the level of nitrates in the influent and those generated within the reactor system itself. The present system enables the modification to be made at a reasonable cost. In addition, the system reduces the possibility of toxic levels of contaminates because the completely mixed continuous nature of the system rapidly dilutes contaminants. Finally, the present system removes the need to have influent storage tanks, which are often required with batch systems.

These and other features and advantages of this invention will become more apparent to those skilled in the art from the detailed description of a preferred embodiment. The drawing that accompanies the detailed description is described below.

DETAILED DESCRIPTION OF A PREFERRED EMBODIMENT

Figure 1:
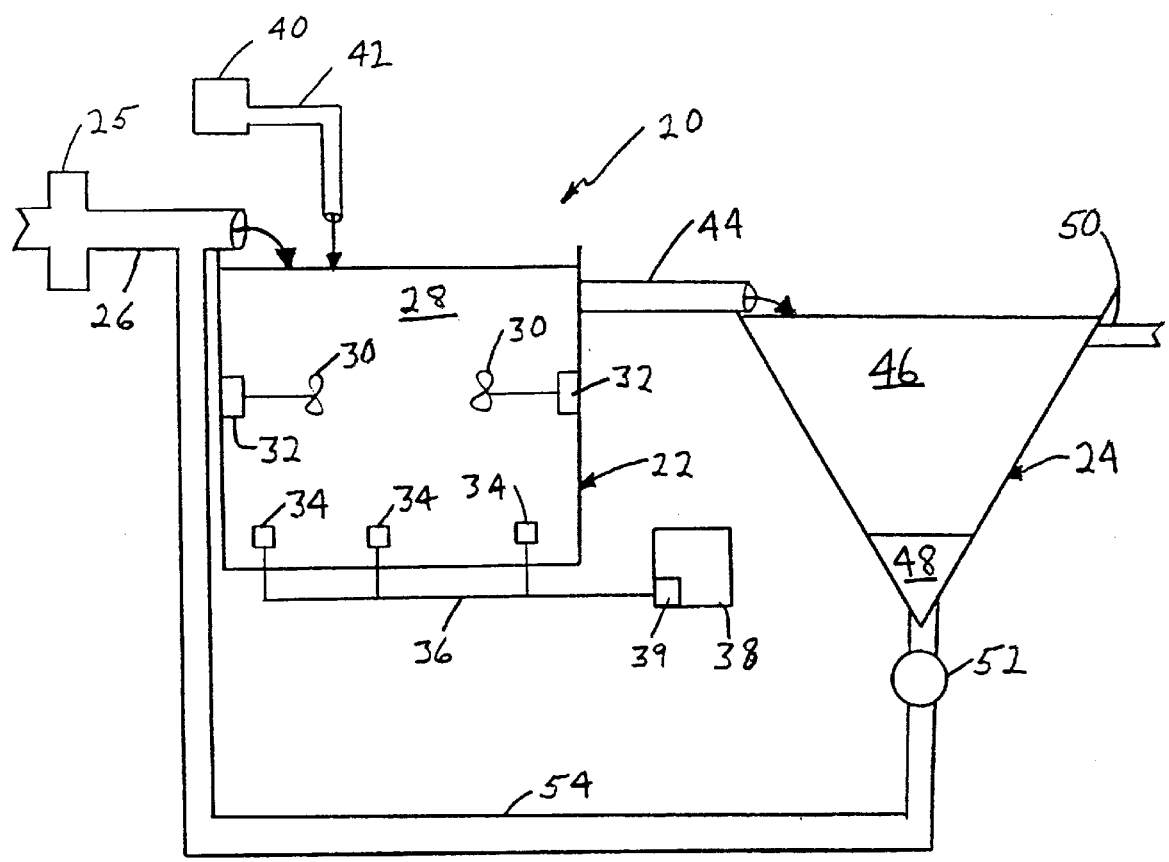
FIG. 1 is a cross sectional schematic drawing of a continuous flow completely mixed waste water treatment reactor designed according to the present invention.

In FIG. 1 a continuous flow completely mixed waste water treatment reactor system designed according to the present invention is generally shown at 20. The reactor system 20 comprises a treatment basin 22 and a clarifier 24. A pump 25 and an influent delivery pipe 26 continuously deliver influent waste water from a facility to the treatment basin 22. The influent waste water rapidly and completely mixes with the mixed liquor 28 already in the basin 22. The capacity of the basin 22 may be variable, for example, the present invention can be used with a basin having a capacity of several million gallons. A plurality of mixers 30 with their associated motors 32 ensure that the mixed liquor 28 is completely and vigorously mixed at all times. As would be understood by one of ordinary skill in the art the mixers 30 may be of various types including overhead mounted, platforms and combined with aerators. In addition, a smaller basin 22 may require fewer mixers 30.

A plurality of aerators 34 are located in the basin 22. As will be understood by one of ordinary skill in the art the aerators 34 may be any of several types including floating aerators, platforms and combined jet aerators/mixers. A supply line 36 connects the aerators 34 to an oxygen source 38. A controller 39 operably connected to the oxygen source 38 controls the release of oxygen from the oxygen source 38. As will be understood by one of ordinary skill in the art, the oxygen source 38 may comprise pure oxygen or an air mixture. In addition, the controller 39 may either be a microprocessor connected to a valve or it could be a valve that is operated manually. What is necessary is that the flow of oxygen into basin 22 can be controlled and cycled on and off.

A supplemental organic carbon source 40 includes a feed tube 42 that feeds into the basin 22. There are numerous suitable supplemental carbons as is known in the art, for example, one can introduce an additional concentrated wastewater stream, preferably having little or no nitrogen in it, or methanol, or ethylene glycol or simple sugars, or mixtures of these sources. The flow of supplemental carbon into the basin 22 is timed as discussed below.

A clarifier feed line 44 continuously feeds a portion of the mixed liquor 28 into the clarifier 24. In the clarifier 24 the mixed liquor 28 separates into an effluent 46 and a sludge 48. Continuously, clarified effluent 46 flows out an effluent outflow 50 to a discharge stream or it can be recirculated for other uses. The system 20 may further include additional purification steps beyond the clarifier 24 such as, for example, a sand filter or additional filtering. Periodically or continuously, the sludge 48 is removed from the clarifier 24 through a pump 52 with a valve (not shown). The pump 52 pumps the sludge 48 through a sludge return line 54 into the influent delivery pipe 26 for recirculation. As is known in the art a portion of the returning sludge is removed for sludge wasting. In general the solids content in the treatment basin 22 is from about 0.2% to about 1.0% while the solids in the clarifier 24 may be from about 1% to 4%.

As discussed above the reactor system 20 is a continuous flow system. The influent continuously flows into the basin 22 and the effluent 46 continuously flows out of the clarifier 24. The mixers 30 ensure that the mixed liquor 28 is always completely mixed. Key to the reactor system 20 is a "time switch" concept for controlling the oxygen level in the mixed liquor 28. The time switch concept comprises turning on and off the oxygen source 38 to thereby create aerobic and anoxic cycles in the basin 22. In addition, the time switch concept involves timing the addition of supplemental carbon 40 to a short period of time at the beginning of an anoxic cycle to aid in removal of nitrates by the heterotrophic bacteria. Because the system 20 is completely mixed, when the oxygen conditions are changed the system 20 rapidly equilibrates to a new oxygen level.

The advantage of the time switch system versus a standard aerobic system was further demonstrated using the simulation computer program SIMBA®. The acronym SIMBA stands for SIMulation von Belebtschlamm Anlagen and is available from the software supplier IFAK Magdeburg, Germany. The term Belebtschlamm Anlagen means activated sludge process in German. The program runs on the MATLAB® software platform, a commonly used software program for mathematical and engineering applications. The program SIMBA® can be used to simulate changes to any of a number of variables in a waste water treatment system and provides an analysis of the effect of these changes on the efficiency of the system. Shown below in Table 1 is a SIMBA® derived comparison of the treatment efficiency of a standard aerobic only waste water treatment system versus a system using the time switch concept. In this comparison the time switch cycle was set to 1 hour air on followed by 1 hour of air off. The influent to each system was set as follows: flow of 900 gallons per minute; Total Organic Carbon (TOC) at 100 parts per million (ppm); Biodegradable TOC at 10 ppm; Nitrates ($NO_3$—N) at 100 ppm; and Ammonia ($NH_4$—N) at 100 ppm. The results reported in Tables 1–3 for the levels of TOC, $NO_3$—N, and $NH_4$—N are the averages over the cycle period. The results demonstrate that under the standard aerobic only system virtually full removal of the ammonia can be accomplished, but Nitrates are not removed. In fact, the level of Nitrates in the effluent is nearly double of that found in the influent. By way of contrast, the time switch system can completely remove both Ammonia and Nitrates.

TABLE 1

| Mode | Air on/off hourly cycle | TOC, ppm in effluent | NO$_3$—N, ppm in effluent | NH$_4$—N, ppm in effluent | MeOH kg/day | Nitrate removed kg/day | MeOH/Nitrates removed, kg/kg |
|---|---|---|---|---|---|---|---|
| Standard | — | 90 | 196 | 1 | 0 | 20 | — |
| Time switch | 1/1 | 90 | 3.5 | 2.2 | 4100 | 973 | 4.22 |

The program SIMBA® was used to simulate changes to the air on/off cycle length for the time switch system with the same influent conditions as in Table 1 and the results are reported in Table 2 below.

removed kg is fairly constant at 4.30. At higher levels of methanol supplementation the efficiency is reduced as can be seen from the rise in this ratio at a level of methanol of 5000 kg/day.

TABLE 2

| Mode | Air on/off hourly cycle | TOC, ppm in effluent | NO$_3$—N, ppm in effluent | NH$_4$—N, ppm in effluent | MeOH boosting, kg/day | Nitrates removed, kg/day | MeOH/Nitrates removed kg/kg |
|---|---|---|---|---|---|---|---|
| Time switch | 0.25/0.25 | 90 | 1 | 1.6 | 4900 | 987 | 4.97 |
| Time switch | 0.5/0.5 | 90 | 1.5 | 1.7 | 4400 | 985 | 4.47 |
| Time switch | 1/1 | 90 | 3.5 | 2.2 | 4100 | 973 | 4.22 |
| Time switch | 2/2 | 90 | 6.5 | 4 | 4000 | 959 | 4.17 |
| Time switch | 3/3 | 90 | 20 | 6 | 4000 | 951 | 4.21 |
| Time switch | 4/4 | 90 | 25 | 8 | 3900 | 932 | 4.18 |

The results in Table 2 demonstrate that as the cycle time shortens the Nitrate removed increases, but this requires increasing amounts of methanol boosting. It is beneficial from a cost stand point to keep the methanol supplementation as low as possible. In a preferred embodiment, each cycle of anoxic conditions and aerobic conditions is kept to about one hour. As shown in Table 2 this cycle length provides the most benefit to removal of Nitrates at a reasonable methanol supplementation level.

The SIMBA® program was further used to simulate the effect of changing the methanol supplementation in a time switch system having a 1 hour on/off cycle length with the same influent conditions as in Table 1. The results are presented in Table 3 below.

The hydraulic residence time in the system 20 is generally about 24 hours and the solids retention time is generally about 6 to 10 days or more. As will be understood by one of ordinary skill in the art, these values can vary depending on the size of the system and other factors. The hydraulic residence time may vary between 4 hours and 3 days. The frequent cycling relative to the residence time permits almost complete conversion of the ammonia to nitrates and almost complete removal of both influent and generated nitrates. A typical operating cycle would be as follows: air inflow for a sufficient amount of time to raise and maintain the dissolved oxygen in the basin 22 at a level of between 1.0 to 5.0 mgL to create an aerobic environment for approximately one hour; air off for 10 minutes with supplemental carbon feed on for about 10 minutes or until sufficient

TABLE 3

| Mode | Air on/off hourly cycle | TOC, ppm in effluent | NO$_3$—N, ppm in effluent | NH$_4$—N, ppm in effluent | MeOH boosting, kg/day | Nitrates removed, kg/day | MeOH/Nitrates removed kg/kg |
|---|---|---|---|---|---|---|---|
| Time switch | 1/1 | 90 | 152 | 1.7 | 1000 | 232 | 4.30 |
| Time switch | 1/1 | 90 | 105 | 1.7 | 2000 | 465 | 4.30 |
| Time switch | 1/1 | 90 | 58 | 1.7 | 3000 | 699 | 4.29 |
| Time switch | 1/1 | 90 | 10 | 1.7 | 4000 | 941 | 4.25 |
| Time switch | 1/1 | 90 | 2 | 1.7 | 5000 | 981 | 5.10 |

The results of Table 3 demonstrate that there is a level of approximately 4000 kg/day of supplementation that provides the most benefit with a 1/1 hour cycle. Up to this level of supplementation the ratio of Methanol kg to Nitrate supplemental carbon has been added; air continued off and supplemental carbon feed off for 50 minutes to rapidly drop and maintain the dissolved oxygen in the basin 22 at a level equal to or below 0.5 mg/L to create an anoxic environment;

cycle repeats. The cycle period will depend on the influent levels of nitrates, organic carbon and ammonia as would be understood by one of ordinary skill in the art. Also, the aerobic period does not necessarily have to have the same length as the anoxic period. When a system 20 has a very short hydraulic residence time, the cycle length will advantageously be shorter. During the cycles the influent and effluent are continuously flowing under uniform conditions. During the aerobic conditions the dissolved oxygen rapidly reaches over 1.0 mg/L and may go to approximately 5.0 mg/L. As an upper limit the dissolved oxygen could go up to 10 to 15 mg/L with the use of pure oxygen. During the anoxic conditions the dissolved oxygen rapidly falls to below 0.5 mg/L and is maintained there. The controller 39 can be used to set the periods of each condition. Alternatively, the system 20 could include manually operated valves to control the flow of air into the basin 22.

During the aerobic period autotrophic bacteria oxidize the ammonia to nitrates using the nitrification reaction. During the anoxic period the heterotrophic bacteria consume organic carbon and convert the nitrates, from the influent and those generated by the autotrophic bacteria, into nitrogen gas. By using the time switch concept of the present invention the rapid cycling between aerobic and anoxic conditions permits the reactor system 20 to remove ammonia, organic carbon, and nitrates very efficiently.

In a typical reactor system 20 there will also be monitoring of the pH of the basin 22 and addition of buffering material if necessary to maintain the pH in an appropriate range of between about 6.5 and 8.0. The nitrification reaction by autotrophic organisms tends to lower the pH and the denitrification by heterotrophic organisms tends to raise the pH. One of ordinary skill in the art understands that reactor system 20 may further include phosphorous supplementation and addition of materials, such as, for example, polymeric material for flocculation, and monitors for influent and effluent levels of organic carbon, ammonia, and nitrates.

Reactor system 20 may further include monitoring equipment for monitoring the levels of dissolved oxygen, organic carbon, nitrates, and ammonia in the influent, mixed liquor 28 and effluent stream. Based on the monitored levels, one may adjust the anoxic period, aerobic period, carbon supplementation, and other parameters of the system 20. Typical influent levels of organic carbon are at or below 400 ppm, ammonia at 100–200 and nitrates at 100–800 ppm. As would be understood by one of ordinary skill in the art, the levels of nitrates are increased by the autotrophic bacteria.

The present invention has been described for illustrative purposes in the environment of a simple single reactor/clarifier system. As will be understood by one of ordinary skill in the art the time switch system is also applicable to more complex systems such as, for example, two completely mixed continuous flow reactors in series followed by a clarifier or two reactor/clarifier systems in series.

The foregoing invention has been described in accordance with the relevant legal standards, thus the description is exemplary rather than limiting in nature. Variations and modifications to the disclosed embodiment may become apparent to those skilled in the art and do come within the scope of the invention. Accordingly, the scope of legal protection afforded this invention can only be determined by studying the following claims.

We claim:

1. A method for treating waste water comprising the following steps:
   a) continuously flowing an influent into a treatment basin;
   b) continuously flowing an effluent out of the treatment basin into a clarifier;
   c) continuously completely mixing the contents of the treatment basin;
   d) introducing oxygen into the treatment basin for a first predetermined time period of from 15 to 120 minutes;
   e) stopping the introduction of oxygen into the treatment basin for a second predetermined time period of from 15 to 120 minutes; and
   f) repeating steps d) and e), wherein steps (a), (b), and (c) occur simultaneously. .

2. A method as recited in claim 1 wherein step e) further comprises introducing a supplemental source of carbon into the basin for a third predetermined time period, with the third predetermined time period being no greater than the second predetermined time period.

3. A method as recited in claim 2 further comprising selecting a concentrated wastewater stream, methanol, ethylene glycol, a simple sugar, or mixtures thereof as the supplemental source of carbon.

4. A method as recited in claim 1 where in step d) a dissolved oxygen concentration in the basin is maintained at or above 1.5 mg/L.

5. A method as recited in claim 1 where in step e) a dissolved oxygen concentration in the basin is maintained at or below 0.5 mg/L.

6. The method of claim 1 wherein steps d) and e) further comprise selecting as the first and the second predetermined time periods a period of time of from 60 to 120 minutes.

* * * * *